US008334026B2

(12) United States Patent
Chretien et al.

(10) Patent No.: US 8,334,026 B2
(45) Date of Patent: Dec. 18, 2012

(54) TUNABLE FLUORESCENT UV CURABLE GEL INKS CONTAINING FLUORESCENT MONOMERS FOR FOOD PACKAGING APPLICATIONS

(75) Inventors: Michelle N Chretien, Mississauga (CA); Naveen Chopra, Oakville (CA); Peter G Odell, Mississauga (CA); Jennifer L Belelie, Oakville (CA)

(73) Assignee: Xerox Corporation, Norwalk, CT (US)

( * ) Notice: Subject to any disclaimer, the term of this patent is extended or adjusted under 35 U.S.C. 154(b) by 616 days.

(21) Appl. No.: 12/474,946

(22) Filed: May 29, 2009

(65) Prior Publication Data

US 2010/0304040 A1   Dec. 2, 2010

(51) Int. Cl.
*C08J 7/04* (2006.01)
*C08J 7/18* (2006.01)
*C08F 2/48* (2006.01)
*C08F 2/46* (2006.01)
*C25D 1/12* (2006.01)
*C25D 13/00* (2006.01)
*C25D 15/00* (2006.01)
*C23F 17/00* (2006.01)
*C23C 28/00* (2006.01)

(52) U.S. Cl. ........ 427/511; 427/487; 427/500; 427/508; 427/514; 427/520; 427/521; 204/471; 204/478

(58) Field of Classification Search .............. 427/511, 427/508, 487, 500, 514, 520, 521; 204/471, 204/478
See application file for complete search history.

(56) References Cited

U.S. PATENT DOCUMENTS

| 5,389,958 | A | 2/1995 | Bui et al. | |
| 7,270,408 | B2 | 9/2007 | Odell et al. | |
| 7,276,614 | B2 | 10/2007 | Toma et al. | |
| 7,279,587 | B2 | 10/2007 | Odell et al. | |
| 7,323,498 | B2 | 1/2008 | Belelie et al. | |
| 7,501,015 | B2 | 3/2009 | Odell et al. | |
| 7,531,582 | B2 | 5/2009 | Toma et al. | |
| 7,538,145 | B2 | 5/2009 | Belelie et al. | |
| 2002/0152928 | A1* | 10/2002 | Lawandy et al. | 106/31.13 |
| 2003/0175506 | A1* | 9/2003 | Schrof et al. | 428/343 |
| 2003/0204036 | A1* | 10/2003 | Ishizawa et al. | 526/319 |
| 2005/0137282 | A1* | 6/2005 | Cagle et al. | 523/160 |
| 2006/0119686 | A1 | 6/2006 | Odell | |
| 2006/0132570 | A1* | 6/2006 | Odell et al. | 347/102 |
| 2006/0205841 | A1* | 9/2006 | Furuno et al. | 523/160 |
| 2007/0043145 | A1* | 2/2007 | Beck et al. | 523/160 |
| 2007/0120921 | A1 | 5/2007 | Carlini et al. | |
| 2007/0120922 | A1* | 5/2007 | Belelie et al. | 347/100 |
| 2007/0120924 | A1 | 5/2007 | Odell et al. | |
| 2007/0123723 | A1* | 5/2007 | Odell et al. | 554/36 |
| 2007/0211110 | A1 | 9/2007 | Iftime et al. | |
| 2007/0254978 | A1 | 11/2007 | Odell et al. | |
| 2008/0075863 | A1* | 3/2008 | Cai et al. | 427/372.2 |
| 2008/0087190 | A1 | 4/2008 | Iftime et al. | |
| 2008/0090928 | A1 | 4/2008 | Iftime et al. | |
| 2009/0104373 | A1 | 4/2009 | Vanbesien et al. | |

FOREIGN PATENT DOCUMENTS

EP      0808855    * 11/1997
WO   WO 2007/057632   * 5/2007

OTHER PUBLICATIONS

Simionescu et al. (Polymer Bulletin vol. 2 pp. 51-56 1980).*
Ishizawa et al. (Journal of Polymer Science A vol. 42 No. 18 pp. 4656-4665), 2004.*
MiniScience Inc. (C) 2005 {taken as December} {http://catalog.miniscience.com/catalog/electricity/Black_Light_Uses.html}.*
Gershuni et al. (Journal of Physical Chemistry 1980 vol. 84 pp. 517-520).*
Aug. 19, 2010 European Search Report issued in EP 10 16 4113.
U.S. Appl. No. 12/245,782, Oct. 6, 2008, Gabriel Iftime.
"Dimer Acids," *Kirk-Othmer Encyclopedia of Chemical Technology*, vol. 8, 4th Ed. (1992), pp. 223 to 237.
Aug. 11, 2010 European Search Report issued in EP 10 16 4113.

* cited by examiner

*Primary Examiner* — Patrick Ryan
*Assistant Examiner* — Aaron Greso
(74) *Attorney, Agent, or Firm* — Oliff & Berridge, PLC

(57) ABSTRACT

The radiation-curable phase-change ink composition having at least one radiation curable fluorescent co-monomer and a gellant. The radiation-curable phase-change ink composition offers both document security features as well as potential brand highlight features. The radiation-curable phase-change ink composition combines the unique attributes of the UV curable gel system, with its tremendous substrate latitude, with the ability to add tunable fluorescent effects without the safety concerns of small molecule fluorescent additives. Exemplary ink compositions include a first co-monomer, least one radiation curable fluorescent co-monomer, and a gellant. Methods for making and using these ink compositions and ink compositions are also provided.

25 Claims, No Drawings

TUNABLE FLUORESCENT UV CURABLE GEL INKS CONTAINING FLUORESCENT MONOMERS FOR FOOD PACKAGING APPLICATIONS

TECHNICAL FIELD

This disclosure is generally directed to curable gel inks, such as radiation-curable phase-change inks, and their use in methods for forming images, such as their use in ink jet printing. More specifically, this disclosure is directed to radiation-curable gel inks, such as ultraviolet-light-curable phase-change inks, that comprise a curable gellant and a curable fluorescent co-monomer and the use of such inks in methods for forming images, particularly their use in inkjet printing for food package applications.

RELATED APPLICATIONS

Commonly assigned U.S. patent application Ser. No. 12/245,782, filed Oct. 6, 2008, to Iftime et al., describes radiation-curable compositions containing at least one nanoscale fluorescent pigment particle and/or at least one fluorescent organic nanoparticle, and the use of such inks in methods for forming images, particularly their use in inkjet printing.

Commonly assigned U.S. patent application Ser. No. 11/877,319 filed Oct. 23, 2007, to Vanbesien et al. describes ultraviolet radiation curable varnishes (UV curable varnish) containing a fluorescent component that may be used in an image forming device to print transient information on an image receiving substrate (substrate) or document.

Commonly assigned U.S. application Ser. No. 11/548,774 (US '774) filed Oct. 12, 2006, to Iftime et al., discloses a radiation curable ink containing a fluorescent material that upon exposure to activating energy fluoresces such that an image that was not visible prior to exposure to the activating energy becomes visible. US '774 also discloses an ink jet system and a process for printing the radiation curable ink. The radiation curable ink is applied to a portion of or an entire surface of a substrate via spot coating or flood coating techniques to form the image with the radiation curable ink on the portion of or the entire surface of the substrate. The radiation curable ink of US '774 is applied onto the surface of the substrate without regard for an image-on-image relationship of the underlying text.

Commonly assigned U.S. patent application Ser. No. 11/451,342, filed Jun. 13, 2006, to Odell et al., describes an ink composition comprising an ink vehicle that comprises one or more curable components, wherein the curable components are chosen from molecules including two reactive functional groups and one or more long aliphatic hydrocarbon chains.

Commonly assigned U.S. patent application Ser. No. 11/289,609, filed Nov. 30, 2005, to Odell et al., describes a radiation curable phase change ink comprising an ink vehicle that includes a curable gellant comprised of a curable polyamide-epoxy acrylate component and a polyamide component, and at least one colorant.

Commonly assigned U.S. patent application Ser. No. 11/289,521, filed Nov. 30, 2005, to Belelie et al., describes a composition, comprising: (a) curable monomer; (b) at least one photoinitiator that initiates polymerization of the curable monomer; and.(c) phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature.

Commonly assigned U.S. patent application Ser. No. 11/289,552, filed Nov. 30, 2005, to Belelie et al., describes an ink jettable overprint composition, comprising: at least one of a polymerizable monomer and/or a polymerizable oligomer; at least one photoinitiator; and at least one wax.

Commonly assigned U.S. Pat. No. 7,501,015, filed Nov. 30, 2005, to Odell et al., describes a phase change ink having a viscosity of from about 4 mPa·s to about 50 mPa·s at a first temperature and having a viscosity of from $10^4$ mPa·s to about $10^9$ mPa·s at a second temperature, the second temperature being below the first temperature by at least 10° C., but by no more than 50° C.

Commonly assigned U.S. patent application Ser. No. 11/289,473, filed Nov. 30, 2005, to Carlini et al., describes a radiation curable phase change ink comprising an ink vehicle that includes at least one gellant comprising a curable epoxy-polyamide composite gellant and at least one colorant.

Commonly assigned U.S. Pat. No. 7,323,498, filed May 25, 2005, to Belelie et al., describes a wax-tethered photoinitiator comprising a photoinitiator compound including a wax chain therein, wherein the photoinitiator compound is activated by ultraviolet radiation.

Commonly assigned U.S. patent application Ser. No. 11/034,850, filed Jan. 14, 2005, to Odell et al., describes a method of forming an image from a low viscosity ink on a recording medium comprising: ejecting the low viscosity ink from a printer head in the form of droplets onto an intermediate transfer medium to form the image; partially curing the image on the intermediate transfer medium; transferring the partially cured image onto the recording medium; and farther curing the partially cured image on the recording medium to create a hardened image, wherein the low viscosity ink comprises a monomer, a photoinitiator and a colorant.

The appropriate components and process aspects of each of the foregoing, such as the ink composition components and imaging processes, may be selected for the present disclosure in embodiments thereof. The entire disclosures of the above-mentioned applications are totally incorporated herein by reference.

BACKGROUND

Brand owners, designers and printers are beginning to request package printing with additional sensory features, for example, tactile effects, to add a feeling of increased value to their products. In addition, as a result of worldwide counterfeiting and piracy, security is now a crucial element of some packaging. Package security features are becoming more desirable or necessary to protect brand owners from financial losses associated with product and brand counterfeiting. The cost of product counterfeiting is an estimated $500 billion each year. By adding non-reproducible printed effects to packaging, it is possible to both provide security features as well as differentiation from other similar products, which allows for a potential point-of-purchase advertising tool.

Fluorescent inks and toners are among the most widely used security printing features. A printed document is usually authenticated by detecting the light emitted by the fluorescent component when subjected to black light. The light emitting property cannot be reproduced in a second generation copy. The fluorescent inks and toners are generally applied with ink-jetting systems.

Ink-jetting printing systems are known in the art, and thus extensive description of such devices is not required herein.

Phase change inks are desirable for ink jet printers because they remain in a solid phase at room temperature during shipping, long term- storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Hot-melt inks typically used with ink-jet printers have a wax-based ink vehicle, e.g., a crystalline wax. Such solid ink-jet inks provide vivid color images. In typical systems, the crystalline-wax inks are jetted onto a transfer member, for example, an aluminum drum, at temperatures of approximately 130-140° C. The wax-based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax-based ink is pressed into the paper.

However, the use of crystalline waxes places limitations on the printing process. First, dye diffusion from the ink into paper or other substrates (will lead to poor image quality and showthrough), and the ability for the dye to leach into another solvent that makes contact with the image (will lead to poor water-/solvent-fastness). Dye diffusion is undesirable in many circumstances; its reduction or absence in the image leads to loss of visual or security effect. The presence of the extracted dye on other surfaces or in food stuffs is most undesirable. Furthermore, increased mechanical robustness is desired.

While such known ink compositions are used successfully, a need remains for improved phase-change ink compositions suitable for hot-melt ink-jet printing processes. There is still a need for ink compositions that can be processed at lower temperatures and with lower energy consumption, that have improved robustness, and that have improved jetting reliability and latitude with respect to meeting both the jetting and transfuse requirements of curable ink compositions. In addition, a need remains for phase-change ink compositions that exhibit desirably low viscosity values at jetting temperatures, that generate images with improved look and feel characteristics, that generate images with improved hardness and toughness characteristics, and that are suitable a number of commonly used packaging substrates.

Furthermore, it is desirable to ensure, to the extent that toxic or otherwise hazardous compounds are used in such products, that migration, evaporation or extraction of such materials from the cured material is controlled or ameliorated. When used in certain applications, for example food packaging, and direct to paper printing, it is desirable to reduce the amount of or eliminate altogether extractable species present, for example to meet environmental, health and safety requirements, A particular source of contamination in UV/visible light-cured products has been identified as residual unreacted monomers and photoinitiators and their decomposition products, such as benzaldehydes. Consequently, most commercially available photoinitiators are prohibited from use in such applications, examples of which include foil-laminating adhesives for food packaging, coil coatings for kitchen appliances and certain drug delivery/packaging systems. Similar issues are known to exist when unbound fluorescent particles are added to food packaging systems.

While known compositions and processes are suitable for their intended purposes, a need remains for improved ink incorporating non-migratable, fluorescent molecules for providing both security features as well as differentiation from other similar products in food packaging applications. In addition, a need remains for improved phase change inks. Further, a need remains for fluorescent molecules that are soluble in, miscible in, or otherwise compatible with phase change ink vehicles. Further, there is a need for fluorescent molecules that exhibit reduced migration through cured images when used in curable phase change inks. Additionally, there is a need for fluorescent molecules having improved affinity for phase change inks exhibiting a gel phase during the printing process. A need also remains for fluorescent molecules having reduced volatility. Further, a need remains for fluorescent molecules that have improved affinity for the ordered microstructure of the gel phase, as opposed to being excluded from that order. Additionally, a need remains for fluorescent molecules that are highly curable. There further remains a need for phase change inks with reduced or eliminated amounts of post fusing extractable species.

SUMMARY

The present disclosure in embodiments addresses these variations of needs by providing UV curable inks, particularly radiation curable compositions containing at least one radiation curable fluorescent co-monomer and at least one gellant, and the use of such inks in methods for forming images, particularly their use in inkjet printing in food packaging applications. Such UV curable gel inks may be used for both document security features as well as potential brand highlight features.

UV curable gel ink formulations of the present disclosure have a high affinity for a number of commonly used packaging substrates, including polyester (such as Melinex 813), polypropylene (such as OPPalyte ASW 250), and aluminum foil. The gelling property of the UV gel ink enables excellent dot structure on non-porous flexible packaging substrates, without the need for pinning. After printing, the substrates are exposed to UV light to form robust images and structures. The incorporation of curable fluorescent co-monomers provides a printing ink that offers both document security features as well as potential brand highlight features. This disclosure combines the unique attributes of the UV curable gel system, with its tremendous substrate latitude, with the ability to add tunable fluorescent effects without the safety concerns of small molecule fluorescent additives. The fluorescent moiety is curable and so it will be covalently attached to the polymer matrix following curing, effectively eliminating the opportunity for its migration into food substances.

These and other improvements are accomplished by the radiation-curable phase-change inks described in embodiments herein, and processes of forming images with such inks. In embodiments, radiation-curable phase-change ink vehicles having improved gellant solubility comprise a curable fluorescent co-monomer, a first co-monomer, and a gellant; in which the first co-monomer is a radiation-curable monomer. Embodiments also include ink compositions including such ink vehicles and methods for making and using ink vehicles and ink compositions.

In embodiments, radiation-curable phase-change ink vehicles having improved gellant solubility comprise at least two chemically distinct gellant materials. The chemically distinct gellant materials include a first gellant comprising a curable epoxy-polyamide composite gellant, and a second gellant chosen from the group consisting of amide gellants. Embodiments also include ink compositions including such ink vehicles and methods for making and using ink vehicles and ink compositions.

EMBODIMENTS

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The terms "hydrocarbon" and "alkane" refer, for example, to branched and unbranched molecules having the general formula $C_nH_{2n+2}$, in which n is a number of 1 or more, such as of from about 1 to about 60. Exemplary alkanes include methane, ethane, n-propane, isopropane, n-butane, isobutane, tert-butane, octane, decane, tetradecane, hexadecane, eicosane, tetracosane and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 77 such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing routes include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\eta''$; where $\eta'=G''/\omega$, $\eta''=G'/\omega$ and i is $\sqrt{-1}$. Alternatively a viscometer that can measure only the transient measurement of, for instance, a capillary or shear viscosity, such as those made by Brookfield Engineering Laboratories or Cannon Instrument Company can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs. Similarly, the terms "two or more" and "at least two" refer, for example to instances in which two of the subsequently described circumstances occurs, and to instances in which more than two of the subsequently described circumstances occurs.

Exemplary ink vehicles and ink compositions provide superior print quality while meeting requirements of piezoelectric ink-jet printing processes. In particular, exemplary ink compositions comprise an ink vehicle that comprises a curable fluorescent co-monomer and a first co-monomer and one or more curable organic gellants. Additional exemplary ink compositions comprise an ink vehicle that comprises two or more chemically distinct curable gellants. Exemplary methods of preparing such ink compositions and exemplary methods of using such ink compositions are also described.

The organic gellants function in embodiments to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase-change transition.

In embodiments, the phase-change ink composition is a gel at room temperature. The phase-change ink compositions in embodiments may also be liquid or solid at room temperature.

It is desired for the phase-change radiation-curable ink compositions to have a viscosity of less than about 15 mPa·s, such as less than about 12 mPa·s, for example from about 3 to about 12 mPa·s, from about 5 to about 10 mPa·s, at the temperature of jetting. In particular embodiments, the ink compositions are jetted at temperatures less than 110° C., such as from about 50° C. to about 110° C., for example from about 60° C. to about 100° C., or from about 70° C. to about 90° C.

The phase change nature of the gellant can thus be used to cause a rapid viscosity increase in the jetted ink composition upon the substrate. In particular, jetted ink droplets would be pinned into position on a receiving substrate such as an image-receiving medium (e.g., paper) that is at a temperature cooler than the ink-jetting temperature of the ink composition through the action of a phase-change transition in which the ink composition undergoes a significant viscosity change from a liquid state to a gel state (or semi-solid state).

In embodiments, the temperature at which the ink composition forms the gel state is any temperature below the jetting temperature of the ink composition, for example any temperature that is about 5° C. or more below the jetting temperature of the ink composition. In embodiments, the gel state may be formed at temperatures from about 25° C. to about 80° C., such as from about 30° C. to about 70° C., or from about 30° C. to about 50° C. There is a rapid and large increase in ink viscosity upon cooling from the jetting temperature at which the ink composition is in a liquid state, to the gel transition temperature, at which the ink composition converts to the gel state. The ink composition of some embodiments may show at least a $10^{2.5}$-fold increase in viscosity Optimum transfer efficiency from an intermediate transfer surface and optimum print quality may be achieved if the viscosity of the ink image deposited on the drum is greatly increased after jetting the ink composition, so as to obtain a stable and transferable image that will not smear. A suitable gellant for the ink composition would gel the monomers/oligomers in the ink vehicle quickly and reversibly, and demonstrate a narrow phase-change transition, for example within a temperature range of about 30° C. to about 80° C., such as about 30° C. to about 70° C. The gel state of exemplary ink compositions should exhibit a minimum of $10^{2.5}$ mPa·s, such as $10^3$ mPa·s, increase in viscosity at substrate temperatures, e.g., from about 30° C. to about 70° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity, When the ink compositions of embodiments are in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s. Gel-phase viscosity of embodiments can vary with the print process. For example, the highest viscosities may be suitable for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink formulation and substrate temperature. An additional benefit of the gel state for radiation-curable gellant-containing ink compositions is that higher viscosities of about $10^3$-$10^4$ mPa·s can reduce oxygen diffusion, which in turn leads to a faster rate of cure in free-radical initiation.

Curable Co-Monomers

In embodiments, the ink vehicle may include one or more curable co-monomers, such as a curable second co-monomer, and/or a curable third co-monomer, etc. In particular embodiments, at least a curable fluorescent co-monomer and a curable first co-monomer, may be included in the ink vehicle. In embodiments, the combination of the co-monomers may aid in solubilizing the gellant material. The first curable co-monomer, which is different from the curable fluorescent co-monomer, can be fluorescent or not, as desired, although in embodiments the first co-monomer may not be fluorescent. In embodiments, the curable co-monomers are radiation curable co-monomers Ink compositions of embodiments may comprise a curable fluorescent co-monomer and a curable first co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of liquid UV-curable monomers. The gel phase of such ink compositions allows an ink droplet to be pinned to a receiving substrate.

The curable fluorescent co-monomer may be chosen from any suitable fluorophore that can be covalently tagged with a radiation curable moiety and incorporated into the above formulation.

Suitable fluorophores may include, for example, fluorescent derivatives of acridines, cyanines, oxazin, fluorenes, rhodamines, fluoresceins, merocyanines, luciferines, perylenes, coumarins, xanthenes, thiazoles, pyrenes, and anthracenes, such as Texas Red and 9-hydroxyfluorenylacrylate. The term "fluorescent derivative" describes, for example, a compound derived from another and contains the essential structures allowing for fluorescence of the parent substance.

The non fluorescent curable co-monomers may be chosen from any suitable curable monomers.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, isobornyl(meth)acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, mixtures thereof and the like. As relatively non-polar monomers, mention may be made of isodecyl(meth)acrylate, caprolactone acrylate, 2-phenoxyethyl acrylate, isooctyl (meth)acrylate, and butyl acrylate. In addition, multifunctional acrylate monomers/oligomers may be used not only as reactive diluents, but also as materials that can increase the cross-link density of the cured image, thereby enhancing the toughness of the cured images.

The term "curable monomer" is also intended to encompass curable oligomers, which may also be used in the composition. In embodiments, the curable oligomers may be radiation curable oligomers. Examples of suitable curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CNN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like. As multifunctional acrylates and methacrylates, mention may also be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl)isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

In embodiments, the non-fluorescent curable co-monomers may be chosen from short-chain alkyl glycol diacrylates or ether diacrylates, such as propoxylated neopentyl glycol diacrylate, and the non-fluorescent co-monomer may be chosen from acrylates having short-chain alkyl ester substituents, such as caprolactone acrylate, and the commercially available products CD536, CD 2777, CD585 and CD586 (available from Sartomer Co. Inc.).

The radiation-curable phase-change ink compositions of embodiments may include the one or more curable co-monomers in an amount ranging from about 20 to about 95% by weight, such as from about 40 to about 85% by weight or from about 50 to about 80% by weight, relative to the total weight of the ink composition, and the curable fluorescent co-monomer in an amount ranging from about 0.1 to about 30% by weight, such as from about 0.5 to about 15% by weight or from about 1 to about 5% by weight, relative to the total weight of the ink composition.

The radiation-curable phase-change ink compositions of embodiments may include the one or more curable co-monomers and the curable fluorescent co-monomer in a ratio such that a ratio of the one or more curable co-monomers to the radiation curable fluorescent co-monomer is between about 100 parts to about 1 parts and about 20 parts to about 1 parts, such as about 75 parts to about 1 parts and about 10 parts to about 1 parts.

Curable Gellants

Gellants suitable for use in the radiation curable compositions include a curable gellant comprised of a curable amide, a curable polyamide-epoxy acrylate component and a polyamide component, a curable composite gellant comprised of a curable epoxy resin and a polyamide resin, mixtures thereof and the like. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate such as paper can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference.

As described in U.S. Pat. No. 7,279,587, the amide gellant may be a compound of the formula

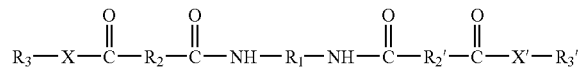

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms, (ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or (iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrite groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

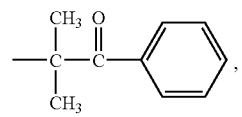

groups derived from 1-hydroxycyclohexylphenylketone, of the formula

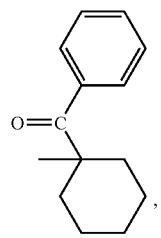

groups derived from 2-hydroxy-2-methyl-1-phenylpropan-1-one, of the formula

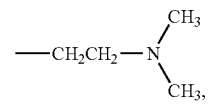

groups derived from N,N-dimethylethanolamine or N,N-dimethylethylenediamine, of the formula

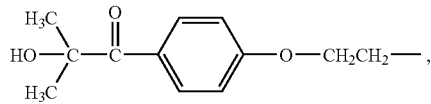

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrite groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof and the like, and wherein two or more substituents may be joined together to form a ring; and X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference in their entireties, and thus are not further detailed herein.

In embodiments, the gellant may comprise a mixture comprising:

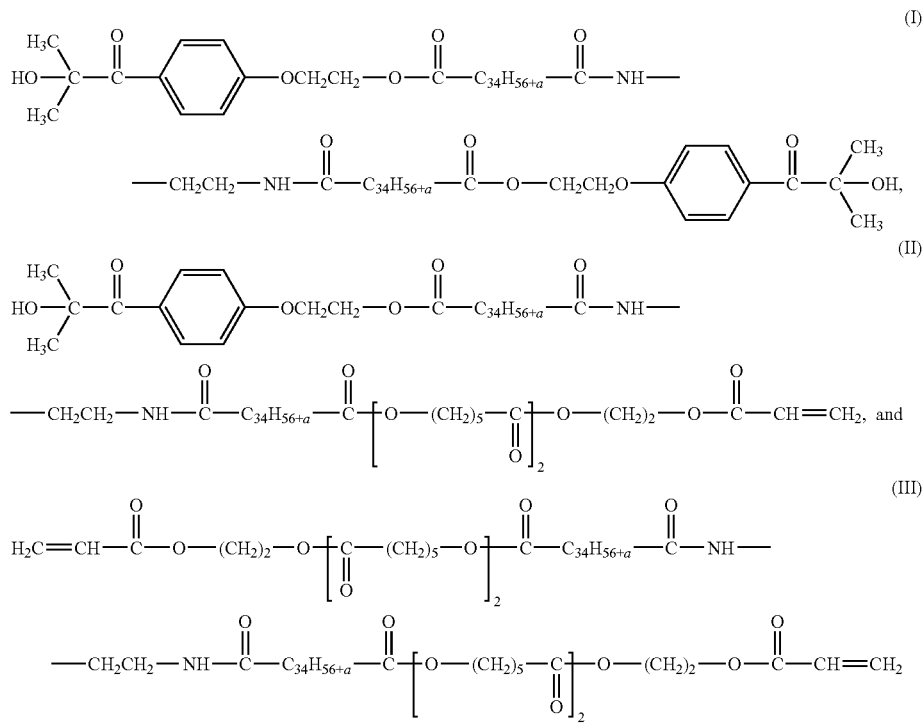

wherein —C$_{34}$H$_{56+a}$— represents a branched alkylene group which may include unsaturations and cyclic groups, wherein the variable "a" is an integer from 0-12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of from about 200 to about 800, such as from about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia PA may also be used. The epoxy resin component is thus functionalized with acrylate or (meth) acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

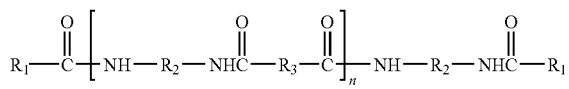

wherein $R_1$ is an alkyl group having at least seventeen carbons, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The composition may include the gellant in any suitable amount, such as about 1% to about 50% by weight of the composition. In embodiments, the gellant may be present in an amount of about 2% to about 20% by weight of the composition, such as about 3% to about 10% by weight of the composition.

The composition also includes optionally at least one curable wax. The wax may be a solid at room temperature (25° C.). Inclusion of the wax may promote an increase in viscosity of the composition as it cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNITLIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

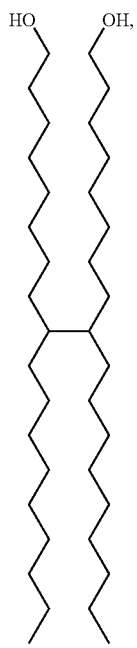

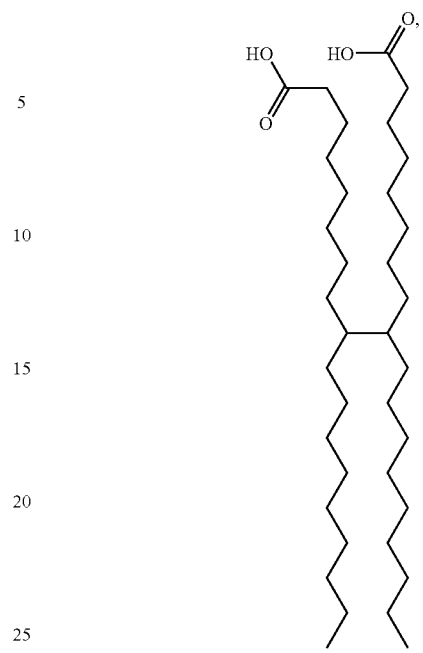

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or dauric acid with n=15, octadecanoic or stearic acid with n=16, eicosanoic or arachidic acid with n=18, docosanoic or bebenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

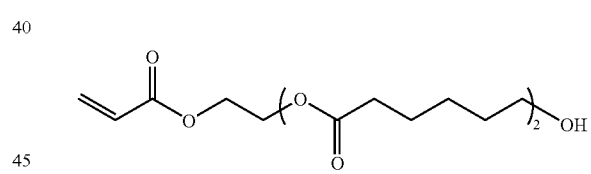

SR495B from Sartomer Company, Inc.;

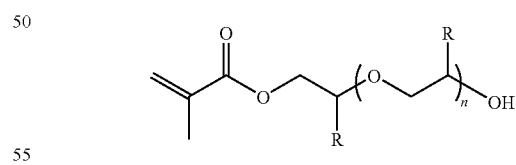

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

Optional Additives

The ink vehicles of embodiments may be mixtures of curable components and, optionally, additional materials including reactive diluents, colorants, initiating agents, antioxidants, as well as any conventional optional additives. Such conventional additives may include, for example, defoamers, slip and leveling agents, pigment dispersants, etc. The inks may also include additional monomeric or polymeric materials as desired.

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in-particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Also suitable for use in embodiments are solvent dyes, such as spirit soluble dyes, because of their compatibility with the ink vehicles of embodiments. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue ON (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASE), Sudan Blue 670 [C.I. 61554] (BASF), Sudan Yellow 146 [C.I. 12700] (BASF), Sudan Red 462 [C.I. 260501] (BASF), and the like.

Pigments are also suitable colorants for the inks. Examples of suitable pigments include, but are not limited to, Violet PALIOGEN Violet 5100 (BASF); PALIOGEN Violet 5890 (BASE); HELIOGEN Green L8730 (BASE); LITHOL Scarlet D3700 (BASF); SUNFAST® Blue 15:4 (Sun Chemical 249-0592); Hostapenn Blue B2G-D (Clariant); Permanent Red P-F7RK; Hostaperm Violet BL (Cladant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SLTNFASTt® Carbazole Violet 23 (Sun Chemical 246-1670); LITHOL Fast Scarlet 14300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASE); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASE); Suco-Yellow L1250 (BASE); Suco-Yellow D1355 (BASF); Suco Fast Yellow D1 355, D1 351 (BASF); HOSTAPERM Pink E 02 (Clariant); Hansa Brilliant Yellow 5GXO3 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASE); Pigment Black K801 (BASE); and carbon blacks such as REGAL 330™ (Cabot), Carbon Black 5250, Carbon Black 5750 (Columbia Chemical), mixtures thereof and the like.

The colorant may be included in the ink composition in an amount of from, for example, about 0.1 to about 15% by weight of the ink composition, such as about 2.0 to about 8% by weight of the ink composition Initiators The radiation-curable phase-change ink may optionally include at least one initiator, such as, for example, at least one or two or more photoinitiators. In embodiments, such an initiator is desirable for assisting in curing of the ink.

In embodiments, at least one photoinitiator that absorbs radiation, for example UV light radiation, to initiate curing of the curable components of the ink may be used. As the photoinitiator for ink compositions of embodiments that are cured by free-radical polymerization, e.g., ink compositions containing acrylate groups or inks comprised of polyamides, mention may be made of photoinitiators such as benzophenones, benzoin ethers, benzil ketals, α-hydroxyalkylphenones, α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethyl-benzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl) butanone-1 (available as Ciba IRGACURE 369); 2-hydroxy-1-(4-(4-(2-hydroxy-2-methylpropionyl)-benzyl)-phenyl)-2-methylpropan-1-one(available as Ciba IRGACURE 127); 2-dimethylamino-2-(4-methylbenzyl)-1-(4-morpholin-4-ylphenyl)-butanone(available as Ciba IRGACURE 379); titanocenes; isopropylthioxanthone; 1-hydroxy-eyclohexy-lphenylketone; benzophenone; 2,4,6-trimethylbenzophe-none; 4-methylbenzophenone; diphenyl-(2,4,6-trimethyl-benzoyl)phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylami-nobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 10% by weight, of the ink composition.

Antioxidants

The radiation-curable phase-change ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

Ink Composition Preparation and Use

The radiation-curable phase-change inks of embodiments may be prepared by any suitable technique. As an example, the inks may be prepared by first dissolving any initiator components into the reactive diluent or curable monomer and optional oligomers mixture, adding the specified amount of gellant, which may be less than 50% by weight or less than 15% by weight of the ink composition, optionally adding the specified amount of reactive wax which may be less than 50% by weight or less than 10% by weight, heating the mixture to obtain a single phase with low viscosity and thereafter adding this hot mixture slowly to a heated pigment dispersion (which may be a concentrate) while agitating the mixture. The ink composition may then be filtered, optionally at an elevated temperature, through a filter to remove extraneous particles. The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

The ink compositions described herein may be jetted at temperatures of less than about 100° C., such as from about 40° C. to about 100° C., or from about 75° C. to about 90° C. The ink compositions are thus ideally suited for use in piezoelectric ink jet devices.

The ink compositions may be employed in an apparatus for direct printing ink-jet processes, wherein when droplets of the melted ink are ejected in an imagewise pattern onto a recording substrate, the recording substrate is a final recording substrate. The recording substrate may be at any suitable temperature during recording. In embodiments, the recording substrate may be at room temperature. However, in some embodiments, the substrate may be heated or cooled to have a surface temperature that is, for example, within the range of gel-phase transition temperatures for the ink composition. For example, the substrate may be maintained at a temperature of about 5° C. to about 160° C., such as from about 15° C. to about 50° C., or from about 20° C. to about 40° C. In this way, the jetted ink may be made to rapidly form a gel. Thus, the ink may be heated to a first temperature at which the ink may be jetted, e.g., above the gel-transition temperature of the ink composition, which first temperature may be, for example, from about 50° C. to about 100° C. The second temperature at which the gel forms is less than the first temperature, for example is from about 5° C. to about 75° C., as discussed above.

The ink compositions can also be employed in indirect (offset) printing ink-jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions are suited for jetting onto an intermediate-transfer substrate, e.g., an intermediate-transfuse drum or belt. In a suitable design, the image may be applied by jetting appropriately colored ink compositions during, e.g., four to eighteen rotations (incremental movements) of the intermediate-transfuse member with respect to the ink-jet head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, i.e., the transfuse member. This allows the image to be rapidly built onto the transfuse member for subsequent transfer and fusing to an image-receiving substrate. Alternatively, the same image build-up can be carried out directly on the image substrate, for example, paper.

The intermediate-transfer member may take any suitable form, such as a drum or belt. The member surface may be at room temperature, although in embodiments the member may be heated to have a surface temperature that is, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a first temperature at which the ink may be jetted, e.g., above the gel-transition temperature of the ink composition, which first temperature may be, for example, from about 40° C. to about 100° C. The second temperature at which the gel forms is less than the first temperature, for example is from about 25° C. to about 100° C., as discussed above.

Once upon the intermediate-transfer member surface, the jetted ink composition may be exposed to radiation to a limited extent so as to effect a limited curing of the ink upon the intermediate-transfer member surface. This intermediate curing is not to cure the ink composition to its full extent, but merely to assist in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to Co-pending applications Ser. Nos. 11/034,850 and 11/005,991, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is thereafter transferred to an image receiving substrate. The substrate may be any suitable material such as non-porous flexible food packaging substrates, adhesives for food packaging paper, foil-laminating fabric, plastic, glass, metal, etc. Following transfer to the substrate, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point on an image to pass under a single unit, while a belt speed 4.0 ms$^{-1}$ would require 0.2 seconds to pass under four bulb assemblies. The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered, if desired or necessary. The curable components of the ink composition react to from a cured or cross-linked network of appropriate hardness. In embodiments, the curing is substantially complete to complete, i.e., at least 75% of the curable components are cured (reacted and/or cross-linked). This allows the ink composition to be substantially hardened, and thereby to be much more scratch resistant, and also adequately controls the amount of show-through on the substrate.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Optionally, a layer of a sacrificial liquid can be applied to the intermediate-transfer member prior to ejecting the droplets of melted ink onto the intermediate-transfer member, whereby the melted ink droplets are ejected onto the sacrificial liquid layer on the intermediate-transfer member, as disclosed in, for example, U.S. Pat. No. 5,389,958. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink composition is transferred to the final recording substrate in a semi-solid state, facilitating penetration of the ink composition into the final substrate (paper fibers, for example) and enabling improved adhesion, reduced show-through, and reduced pile height.

The following examples of radiation-curable phase-change ink compositions further illustrate the foregoing embodiments.

Examples are set forth below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Synthesis of 9-fluorenylacrylate

A sample fluorescent monomer was easily prepared from commercial starting materials following the procedure outlined below.

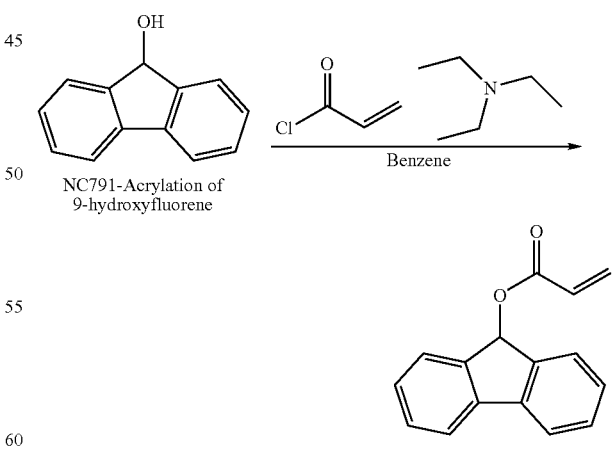

NC791-Acrylation of 9-hydroxyfluorene

Sample reaction scheme for preparation of sample fluorescent monomer.

To a 250 mL round-bottomed flask was added 9-hydroxyfluorene (5 g, 27.4 mmol) and triethylamine (3.86 ml, 27.4 mmol) in benzene (150 mL) to give a colorless solution. The solution was cooled to 8° C. with an ice bath. Next, acryloyl chloride (2.229 mL, 27.4 mmol) was dissolved in 25 mL of benzene, placed in a dropping funnel, and added over 1 hour with vigorous stirring. The reaction formed a white precipitate. The ice bath was removed and the viscous sludge was stirred overnight at room temperature. The resulting cloudy white suspension was washed with 50 mL water, followed by 50 mL 5% NaOH solution, and 50 mL water. The benzene layer was collected and dried with $MgSO_4$, filtered, and rotovapped to give the 9-fluorenylacrylate as a viscous beige oil which crystallized on cooling to 4° C. (4.73 g, 20.02 mmol, 73.0% yield).

The monomer was formulated into a pigmentless UV curable ink (Example A) with the formulation as shown in Table 1.

TABLE 1

Composition of UV Ink (Example A).:

| Compound | Weight % | Function |
| --- | --- | --- |
| Curable amide gallant | 7.5 | Phase change agent |
| Curable acrylate wax | 5.0 | Phase change agent |
| 9-hydroxyfluorenylacrylate | 2.0 | Fluorescent monomer |
| SR9003 | 80.8 | Difuctional acrylate monomer |
| Irgastab UV10 | 0.2 | Stabilizer |
| Irgacure 819 | 1.0 | Photoinitiator |
| Irgacure 127 | 3.5 | Photoinitiator |

The above mixture from Table 1 was heated to 90° C. and stirred for 90 minutes. The resulting formulation had a viscosity of approximately 10 cPs at greater than 80° C. and the viscosity increased to approximately $10^6$ cPs at room temperature as measured using a controlled strain rheometer from TA Instruments and employing parallel plate geometry. Heating at 90° C. for 24 hours did not result in a loss of fluorescence. This point is important since the inks will be routinely heated to less than 90° C. in a printhead in order to enable jetting.

The above formulation was handcoated onto white plastic to give a layer of approximately 1 mm thick and cured at 32 fpm using a Lighthammer 6 with benchtop conveyor (D bulb). The material was fully cured following this exposure and, was brightly fluorescent when exposed to 365 nm light.

Examples 2 through 5 are prophetic examples of other reactive fluorescent moieties that are suitable.

Example 2

Synthesis of [4-(vinyloxy)butyl]9-acridinecarboxylate

To a 1 liter, two neck flask equipped with a stir bar, argon inlet, and stopper is added 9-acridine carboxylic acid hydrate (10.0 grams, 41 mmol, obtained from Sigma-Aldrich, Milwaukee, Wis.) and methylene chloride (500 milliliters). Next, 4-(dimethylamino)pyridine (1.07 gram, 8.8 mmol, obtained from Sigma-Aldrich) is added, and, the reaction mixture is cooled to 0° C. and N,N-dicyclocarbodiimide (DCC) (8.6 grams, 44 mmol, obtained from Sigma-Aldrich) is added portionwise. After completing the DCC addition, the reaction mixture is stirred at 0° C. for 0.5 hour, and 1,4-butanediol vinyl ether (5.44 milliliters, 44 mmol, obtained from Sigma-Aldrich) is added. The reaction is stirred at room temperature until the reaction is deemed complete by $^1$H NMR spectroscopy in $CDCl_3$ (about 2 hours). The reaction mixture is then filtered to remove solid DCHU byproduct, the filtrate concentrated in vacuo and the residue is dissolved in ethyl acetate (300 milliliters). The organic layer is washed with saturated sodium bicarbonate (2×150 milliliters) and water (2×150 milliliters), dried over anhydrous sodium sulfate, filtered, and concentrated in vacuo to furnish [4-vinyloxy)butyl]9-acridinecarboxylate product.

Example 3

Synthesis of [4-(vinyloxy)butyl]ester of Rhodamine B isothiocyanate

To a 1 liter, two neck flask equipped with a stir bar, argon inlet, and stopper is added Rhodamine B isothiocyanate (10.0 grams, 18.6 mmol, obtained from Sigma-Aldrich, Milwaukee, Wis.) and methylene chloride (500 milliliters). Next, 4-(dimethylamino)pyridine (476 milligrams, 3.9 mmol, obtained from Sigma-Aldrich) is added, and, the reaction mixture is cooled to 0° C. and N,N-dicyclocarbodiimide (DCC) (4.12 grams, 20 mmol, obtained from Sigma-Aldrich) is added portionwise. After completing the DCC addition, the reaction mixture is stirred at 0° C. for 0.5 hour, and 1,4-butanediol vinyl ether (2.47 milliliters, 20 mmol, obtained from Sigma-Aldrich) is added. The reaction is stirred at room temperature until the reaction is deemed complete by $^1$H NMR spectroscopy in $CDCl_3$ (about 2 hours). The reaction mixture is then filtered to remove solid DCHU byproduct, the filtrate concentrated in vacuo and the residue is dissolved in ethyl acetate (300 milliliters). The organic layer is washed with saturated sodium bicarbonate (2×150 milliliters) and water (2×150 milliliters), dried over anhydrous sodium sulfate, filtered, and concentrated in vacuo to furnish [4-vinyloxy)butyl]ester of Rhodamine B isothiocyanate.

Example 4

Synthesis of vinyl 4-(pyren-1-yl)butanoate

To a 500 mL, two neck flask equipped with a stir bar, argon inlet, and stopper is added 4-(1-Pyrenyl)butyric acid (10.0 grams, 34.7 mmol, obtained from Sigma-Aldrich, Milwaukee, Wis.), palladium acetate 1,10-phenanthroline complex (403 milligrams, 1 mmol) and vinyl acetate (128 milliliters, 1.39 mol, obtained from Sigma-Aldrich, Milwaukee, Wis.). Next, toluene (200 milliliters) is added, the solution is purged with argon and stirred magnetically at 60° C. for 62 hours. The excess vinyl acetate, along with acetic acid (co-product) is removed, an additional vinyl acetate (32 mL, 0.35 mol) is added, and the reaction is continued for 48 hours at 60° C. under argon to complete the reaction. The excess vinyl ester is removed, and the crude product is filtered to remove suspended catalyst residue, and the toluene is removed in vacuo to famish vinyl 4-(pyren-1-yl)butanoate.

Example 5

Synthesis of [4-(vinyloxy)butyl]6,7-dihydroxy-4-coumarinyl acetate

To a 1 liter, two neck flask equipped with a stir bar, argon inlet, and stopper is added 6,7-dihydroxy-4-coumarinyl acetic acid (10.0 grams, 42.3 mmol, obtained from Sigma-Aldrich, Milwaukee, Wis.) and methylene chloride (500 milliliters). Next, 4-(dimethylamino)pyridine (1.08 grams, 8.9 mmol, obtained from Sigma-Aldrich) is added, and, the reaction mixture is cooled to 0° C. and N,N-dicyclocarbodiimide (DCC) (9.6 grams, 46.5 mmol, obtained from Sigma-Aldrich) is added portionwise. After completing the DCC addition, the reaction mixture is stirred at 0° C. for 0.5 hour, and 1,4-butanediol vinyl ether (5.75 milliliters, 46.5 mmol, obtained from Sigma-Aldrich) is added. The reaction is stirred at room temperature until the reaction is deemed complete by $^1$H NMR spectroscopy in CDCl$_3$ (about 2 hours). The reaction mixture is then filtered to remove solid DCHU byproduct, the filtrate concentrated in vacuo and the residue is dissolved in ethyl acetate (300 milliliters). The organic layer is washed with saturated sodium bicarbonate (2×150 milliliters) and water (2×150 milliliters), dried over anhydrous sodium sulfate, filtered, and concentrated in vacuo to furnish [4-(vinyloxy)butyl]6,7-dihydroxy-4-coumarinyl acetate, It will be appreciated that various of the above-discussed and other features and functions, or alternatives thereof may

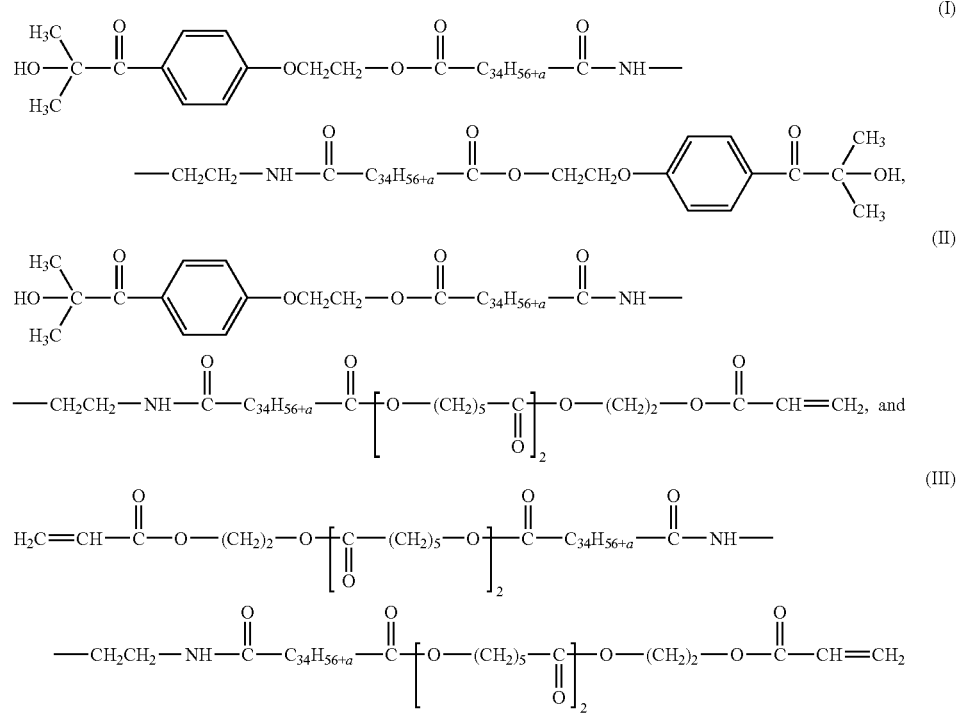

be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A radiation-curable phase-change ink composition, the ink composition comprising:
 a curable fluorescent co-monomer, wherein
  the curable fluorescent co-monomer is a coupling product of an acrylate, methacrylate, styryl, vinyl, vinyl ether, or allyl group and a moiety selected from the group consisting of acridines, cyanines, oxazin, fluorenes, rhodamines, fluoresceins, merocyanines, luciferines, xanthenes, thiazoles, pyrenes, and anthracenes;
 a curable first co-monomer;
 a gellant in an amount of from about 1% to about 50% by weight of the ink composition;
 a photoinitiator;
 and
 optionally a colorant, wherein
 the ink composition has a viscosity that is less than about 15 mPa·s at temperatures less than about 110° C.,
 curing the radiation-curable phase-change ink composition by exposure to UV light forms a UV cross-linked material comprising completely cured, UV cross-linked polymers formed from the curable fluorescent co-monomer and the curable first co-monomer and
 the completely cured, UV cross-linked polymers are fluorescent when exposed to black light.

2. The ink according to claim 1, wherein the gellant is a mixture comprising:

wherein —C$_{34}$H$_{56+a}$— represents a branched alkylene group which optionally include unsaturations and cyclic groups, wherein the variable (a) is an integer from 0 to 12.

3. The ink according to claim 1, wherein the gellant is a condensate product of ethylene diamine and aliphatic dicarboxylic acids.

4. The ink according to claim 1, wherein the ink is substantially colorless when not exposed to activating energy.

5. The radiation-curable phase-change ink composition according to claim 1, wherein the first co-monomer is chosen from the group consisting of radically curable monomers.

6. The radiation-curable phase-change ink composition according to claim 1, wherein the first co-monomer is a difunctional acrylate monomer.

7. The radiation-curable phase-change ink composition according to claim 1, further comprising a curable acrylate wax comprising a reaction product of a hydroxyl-terminated polyethylene wax and an acrylate.

8. The radiation-curable phase-change ink composition according to claim 1, wherein the first co-monomer is present in an amount ranging from about 20% to about 95% by weight, relative to the total weight of the ink composition, and the curable fluorescent co-monomer is present in an amount ranging from about 0.1% to about 30% by weight, relative to the total weight of the ink composition.

9. The radiation-curable phase-change ink composition according to claim 1, wherein the curable first co-monomer is a curable oligomer.

10. The radiation-curable phase-change ink composition according to claim 9, wherein the oligomer is selected from the group consisting of epoxy acrylate, polyester acrylate and polyurethane acrylate.

11. The radiation-curable phase-change ink composition according to claim 1, further comprising a second curable co-monomer.

12. The radiation-curable phase-change ink composition according to claim 1, wherein the photoinitiator comprises two or more photoinitiators.

13. The radiation-curable phase-change ink composition according to claim 1, wherein the photoinitiator is selected from the group consisting of 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phospine oxide, phenyl bis(2,4,6-trimethylbenzoyl) phosphine oxide and benzyl-dimethylketal, isopropylthioxanthone, and mixtures thereof.

14. The radiation-curable phase-change ink composition according to claim 1, wherein the ratio of the first co-monomer to the curable fluorescent co-monomer is between about 100 to about 1 and about 20 to about 1.

15. The radiation-curable ink composition according to claim 1, wherein the radiation curable fluorescent co-monomer is represented by formula (A):

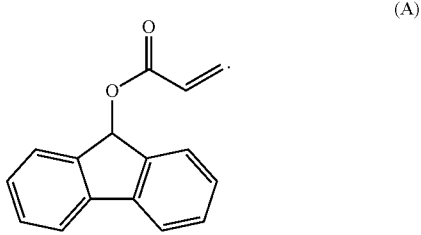

(A)

16. The radiation-curable ink composition according to claim 1, wherein the at least one radiation curable fluorescent ink is substantially colorless when not exposed to activating energy.

17. The radiation-curable ink composition according to claim 1, further comprising a non-fluorescent colorant selected from the group consisting of pigments, dyes, mixtures of pigments and dyes, mixtures of pigments, and mixtures of dyes.

18. The radiation-curable ink composition according to claim 1, wherein the first curable co-monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetracarylate, dipentaerythritol pentacarylate, ethoxylated pentaerythritol tetraacrylate, and mixtures thereof.

19. A process of making an image having fluorescent ability, comprising:
    jetting an ink from an ink set onto a recording media to form an image, and
    curing the image by exposing the image to radiation,
    wherein the ink set comprises the radiation-curable phase-change ink composition according to claim 1, wherein upon exposure to activating energy, the fluorescent material fluoresces to cause a visible change in the appearance of the ink.

20. The process according to claim 19, wherein the wavelength of the activating energy is from about 200 nm to about 1,100 nm.

21. The radiation-curable ink composition according to claim 1, wherein the first curable co-monomer is fluorescent.

22. The radiation-curable ink composition according to claim 1, wherein the curable fluorescent co-monomer is a coupling product of an acrylate, methacrylate, styryl, vinyl, vinyl ether, or allyl group and a moiety selected from the group consisting of acridines, cyanines, oxazin, rhodamines, merocyanines, luciferines, xanthenes, thiazoles, pyrenes, and anthracenes.

23. The radiation-curable ink composition according to claim 1, wherein the curable fluorescent co-monomer is a coupling product of an acrylate, methacrylate, styryl, vinyl, vinyl ether, or allyl group and a moiety selected from the group consisting of acridines, cyanines, xanthenes, and anthracenes.

24. The radiation-curable ink composition according to claim 1, wherein the curable fluorescent co-monomer is a coupling product of an acrylate, methacrylate, styryl, vinyl, vinyl ether, or allyl group and a moiety selected from the group consisting of acridines, and cyanines.

25. The radiation-curable ink composition according to claim 1, wherein completely curing the radiation-curable phase-change ink composition by exposure to UV light forms a completely cured material that is fluorescent when exposed to 365 nm light.

* * * * *